(No Model.)

G. M. AMON & F. X. BERGER.
ASH SIFTER.

No. 345,823. Patented July 20, 1886.

WITNESSES:
A. Schehl.
Harry M. Turk

INVENTORS:
Geo. M. Amon
F. X. Berger
BY Briesen & Steele
ATTORNEYS.

UNITED STATES PATENT OFFICE.

GEORGE M. AMON, OF BROOKLYN, AND FRANZ XAVER BERGER, OF NEW YORK, N. Y.

ASH-SIFTER.

SPECIFICATION forming part of Letters Patent No. 345,823, dated July 20, 1886.

Application filed April 21, 1886. Serial No. 199,608. (No model.)

*To all whom it may concern:*

Be it known that we, GEORGE M. AMON, a resident of Brooklyn, in the county of Kings and State of New York, and FRANZ XAVER BERGER, a resident of New York city, in the county and State of New York, have jointly invented an Improved Ash-Sifter, of which the following is a full, clear, and exact description, reference being made to the accompanying drawings, in which—

Figure 1:
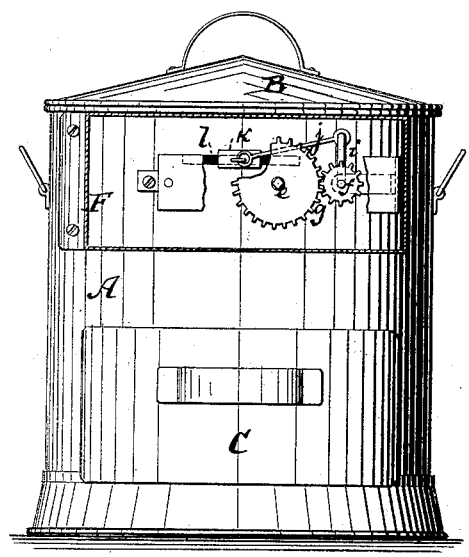
Figure 2:
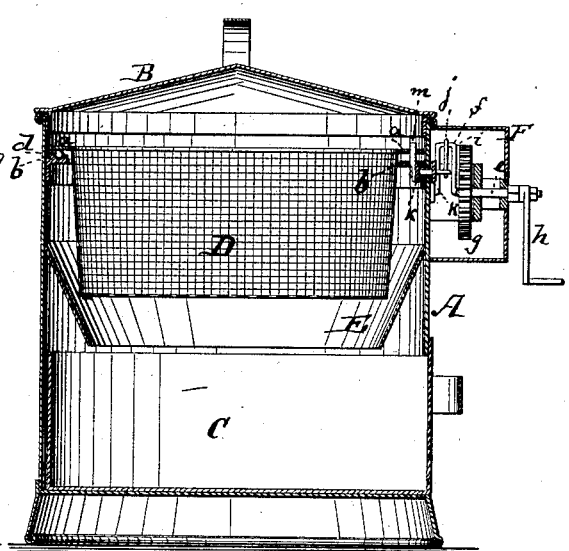
Figure 4:
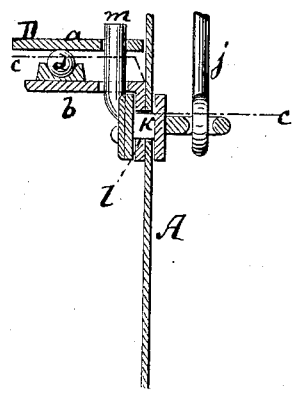
Figure 3:
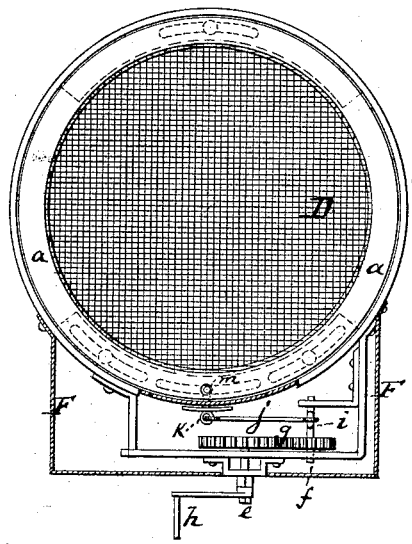
Figure 5:
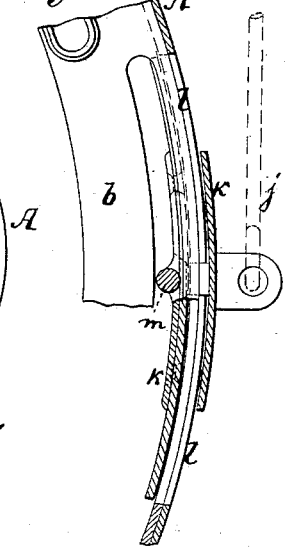

Figure 1 is a side elevation, partly in section, of our improved ash-sifter. Fig. 2 is a vertical central section of the same. Fig. 3 is a top view, partly in section, of the same without the cover. Fig. 4 is a detail section of certain parts in the same plane as Fig. 2, and Fig. 5 is a horizontal section on the line $c\ c$, Fig. 4.

This invention relates to a new ash-sifter.

In the drawings, the letter A represents a cylindrical outer vessel, and B the lid or cover with which the same is or may be covered.

C is a drawer in the lower part of the vessel A, for receiving the ashes from the sifting-vessel D. This sifting-vessel is also of cylindrical or nearly cylindrical form, having a perforated bottom and sides. It is by preference constructed of wire-work having open meshes, but may, if desired, be made of perforated sheet metal.

At the upper part of the vessel D is an outwardly-projecting flange, $a$, which serves as a means for supporting the vessel D on an inwardly-projecting ring or plate, $b$, that is attached to the inner circumference of the vessel A. Below the vessel D and above the drawer C, we prefer to secure within the vessel A a truncated conical deflector, E, which serves to guide the ashes that fall from the sifting-vessel D into the drawer C, and prevents the ashes getting between the walls of the drawer and the walls of the vessel A. Friction rollers or balls $d$ may be interposed between the flange $a$ and the plate $b$.

On the outer side of the vessel A is secured a frame, F, in which are the bearings of two shafts, $e$ and $f$, which are geared together by toothed-wheels $g$. A suitable crank-handle, $h$, on the shaft $e$ will, when revolved, cause the shaft $f$ also to be turned. The shaft $f$ has a crank, $i$, which connects by a rod, $j$, with a slide, $k$, that extends through a slot, $l$, (see Fig. 1,) in the wall of the vessel A. On the inner side of the vessel A this slide $k$ has an upwardly-projecting pin, $m$, which extends through an aperture in the flange $a$ of the vessel D. Whenever the shaft $e$ is revolved, the slide $k$ is reciprocated, and with it the vessel D, so as to sift whatever ashes are put into it. It is not essential that the crank-handle $h$ be attached to the shaft $e$, because the same may be directly attached, if desired, to the shaft $f$, in which case the shaft $e$ and the toothed-wheels $g$ can be dispensed with. After the sifting the vessel D can be easily taken out to discharge whatever coal or cinders it may contain, the perforated flange $a$ permitting its ready disconnection from the actuating-pin $m$.

The flange or plate $b$ is slotted, as in Fig. 5, to permit the pin $m$, which moves the sifter D, to move in the desired direction and to the required extent.

We claim—

In an ash-sifter, the combination of the main outer vessel, A, having slotted inner flange or plate, $b$, and the slot $l$, with the removable sieve D, having outer flange, $a$, the actuating-pin $m$, slide $k$, rod $j$, and crank-shaft $f$, the pin $m$ extending upward through a slot in the flange $b$, as and for the purpose herein shown and described.

GEORGE M. AMON.
FRANZ XAVER BERGER.

Witnesses:
GUSTAV SCHNEPPÉ,
HARRY M. TURK.